US008289838B2

(12) United States Patent
Banks et al.

(10) Patent No.: US 8,289,838 B2
(45) Date of Patent: *Oct. 16, 2012

(54) DATA TRANSFER IN A MESSAGING SYSTEM

(75) Inventors: Andrew D J Banks, Romsey (GB); David Ware, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 519 days.

This patent is subject to a terminal disclaimer.

(21) Appl. No.: 12/270,328

(22) Filed: Nov. 13, 2008

(65) Prior Publication Data
US 2009/0122696 A1    May 14, 2009

Related U.S. Application Data

(63) Continuation of application No. 11/044,598, filed on Jan. 27, 2005, now Pat. No. 7,466,648.

(30) Foreign Application Priority Data

Feb. 17, 2004    (GB) .................................. 0403459.1

(51) Int. Cl.
G01R 31/08 (2006.01)
G08C 15/00 (2006.01)
H04J 1/16 (2006.01)
H04J 3/14 (2006.01)
H04L 1/00 (2006.01)
H04L 12/26 (2006.01)
G06F 11/00 (2006.01)
G06F 11/16 (2006.01)

(52) U.S. Cl. .......................................... 370/216; 714/18

(58) Field of Classification Search .................. None
See application file for complete search history.

(56) References Cited

U.S. PATENT DOCUMENTS

| 6,817,018 B1 | 11/2004 | Clarke et al. |
| 7,305,237 B2 * | 12/2007 | Stephens ....................... 455/434 |
| 2004/0190540 A1 * | 9/2004 | Miyake et al. ................ 370/428 |
| 2005/0138528 A1 * | 6/2005 | Ameigeiras et al. .......... 714/774 |

FOREIGN PATENT DOCUMENTS

| WO | 0249292 A1 | 6/2002 |
| WO | WO0249292 A1 * | 6/2002 |

OTHER PUBLICATIONS

T. Goff, J. Moronski, v. Gupta, Freeze-TCP: A true end-to-end TCP enhancement mechanism for mobile environments, pp. 1537-1545, Proceedings of the IEEE INFOCOM 2000 Conference, 2000.*
Zhou, et al., Improve TCP performance in ad hoc network by TCP-RC, 14th IEEE Proceedings on Personal, Indoor and Mobile Radio Communications, Sep. 2003.*
Zhou et al., Improve TCP Performance in Ad Hoc Network by TCP-RC, 14th IEEE Proceedings on Personal, Indoor and Mobile Radio Communications, Sep. 2003, pp. 216-220.

* cited by examiner

*Primary Examiner* — Faruk Hamza
*Assistant Examiner* — Christopher Crutchfield
(74) *Attorney, Agent, or Firm* — Yee & Associates, P.C.; David A. Mims, Jr.

(57) ABSTRACT

There is disclosed a source messaging system having a queue for receiving messages. The source messaging system has means for determining whether a message should be permitted to become INDOUBT. This is done by retrieving a value denoting the maximum number of messages that may be permitted to become INDOUBT at any one time; determining whether the message falls within the range denoted by the value; and responsive to determining that the message falls within the range, permitting the message to become INDOUBT.

4 Claims, 3 Drawing Sheets

DATA TRANSFER IN A MESSAGING SYSTEM

This application is a continuation of application Ser. No. 11/044,598, filed Jan. 27, 2005, status issued as U.S. Pat. No. 7,466,648 on Dec. 16, 2008.

FIELD OF THE INVENTION

The invention relates to the field of messaging and more particularly to dealing with reliable data transfer.

BACKGROUND OF THE INVENTION

In a typical messaging system, a source machine sends messages across a network connection to a target machine. Before being sent, each message is first written to a log such that in the event of a failure, recovery is possible. The source, having sent a set of messages, writes a PREPARE record to the log before forwarding a PREPARE command on to the target. The PREPARE command informs the target that it may process the set of messages.

As far as the source is concerned, this set of messages is said to be INDOUBT. These messages are no longer the responsibility of the source—processing has been handed over to the target machine. However, the status of such messages is INDOUBT since the source does not yet know whether the messages have been safely received by the target (indeed a message may not have even actually left the source). A copy of the messages is retained at the source and may not be deleted from the source until acknowledgement of safe receipt of the set of messages is received at the source.

If failure of the source occurs before receipt of such an acknowledgement, the PREPARE log record ensures that the source does not attempt to re-process those messages associated with the PREPARE record without first checking with the target what the last set of messages it received were.

A disadvantage with such a solution is that a PREPARE record must be periodically forced to the log by the source (and also by the target upon receipt of the PREPARE). Writing to the log is expensive in terms of latency whilst the disk revolves. Further, whilst waiting for an acknowledgement of receipt of the PREPARE command, the network connection may not be used for other tasks.

SUMMARY OF THE INVENTION

Accordingly the invention provides a source messaging system comprising: a queue for receiving messages; means for determining whether a message should be permitted to become INDOUBT, wherein the means for determining comprises: means for retrieving a value denoting the maximum number of messages that may be permitted to become INDOUBT at any one time; means for determining whether the message falls within the range denoted by the value (e.g. between the head of the queue and the maximum number—thus where the value is 4, a message falls within the range if it is one of the first 4 messages on the queue); and means, responsive to determining that the message falls within the range, for permitting the message to become INDOUBT.

INDOUBT in the sense used means that as far as the source is concerned, it is no longer responsible for processing the message. Note, this does not necessarily mean that a message has been received at the target messaging system. Indeed the message may not even have left the source messaging system. However as far as the source messaging system is concerned, the message is in a condition suitable to be sent to the target system.

Preferably it is possible to block transmission of a message from the source to the target (i.e. prevent the message from becoming INDOUBT) until it is determined that the message falls within the range.

In accordance with a preferred embodiment it is possible to receive a value denoting a new maximum number of messages that may be permitted to go INDOUBT at any one time.

Having received the new maximum number, it is preferably possible to determine when the maximum number is less than the old maximum number and means for determining the number of messages on the queue. Responsive to determining that the new maximum value is less than the old maximum value and that the number of messages on the queue is more than the new maximum value, the number of acknowledgements received from a target is counted. Responsive to determining that the number of acknowledgements received is equal or greater than the difference between the old value and the new value, the new value is preferably used to determine the number of messages permitted to become INDOUBT.

In accordance with a preferred embodiment the maximum value can be used when a failure is detected. This could be a failure by the source itself, by the target or even by the network connection connecting the source and the target.

When a failure is detected, the maximum value is preferably used to determine the maximum number of messages that may be INDOUBT. Any message not falling within the range denoted by the maximum value may, in accordance with a preferred embodiment, be processed. Such processing may involve re-routing to another target system. Those messages that are within the range could already have been processed by the original target system. Thus it is preferably possible for the source to negotiate with the target messaging system to determine how many of the assumed to be INDOUBT messages have been received by the target system.

The fact remains however, that messages falling outside the range denoted by the value can preferably be immediately processed (e.g. by re-rerouting the message elsewhere).

Preferably it is possible, responsive to detecting a failure outside of the source (e.g. network connection/target), to determine whether the number of messages on the queue is less than the maximum INDOUBT value and responsive to determining that the number of messages on the queue is less than the maximum INDOUBT value, to reduce the maximum INDOUBT value to the number of messages on the queue.

Preferably, responsive to determining that the failure is restored, it is possible to re-adopt the old maximum INDOUBT value.

According to another aspect, there is provided a method for facilitating data transfer from a source messaging system having a queue, the method comprising the steps of: determining whether a message should be permitted to become INDOUBT, wherein the determining step comprises: retrieving a value denoting the maximum number of messages that may be permitted to become INDOUBT at any one time; determining whether the message falls within the range denoted by the value; and responsive to determining that the message falls within the range, permitting the message to become INDOUBT.

According to another aspect, there is provided a method for facilitating data transfer from a source messaging system having a queue, the method comprising: determining the number of messages on the queue; comparing the number of messages on the queue with a value denoting the maximum number of messages that may be permitted to become INDOUBT at any one time; responsive to the number of messages on the queue being less than the value, permitting a message to become INDOUBT.

Preferably responsive to determining that the number of messages on the queue is at least equal to the value, it is possible to block transmission of a message which is not one of the messages denoted by the value.

According to another aspect there is provided a source messaging system comprising: a queue for receiving messages; means for determining the number of messages on the queue; means for comparing the number of messages on the queue with a value denoting the maximum number of messages that may be permitted to become INDOUBT at any one time; means, responsive to the number of messages on the queue being less than the value, for permitting a message to become INDOUBT.

It will be appreciated that the invention may also be implemented in computer software. Further the software may be stored on a computer readable medium.

BRIEF DESCRIPTION OF THE DRAWINGS

A preferred embodiment of the present invention will now be described, by way of example only, and with reference to the following drawings.

DETAILED DESCRIPTION

Figure 1:
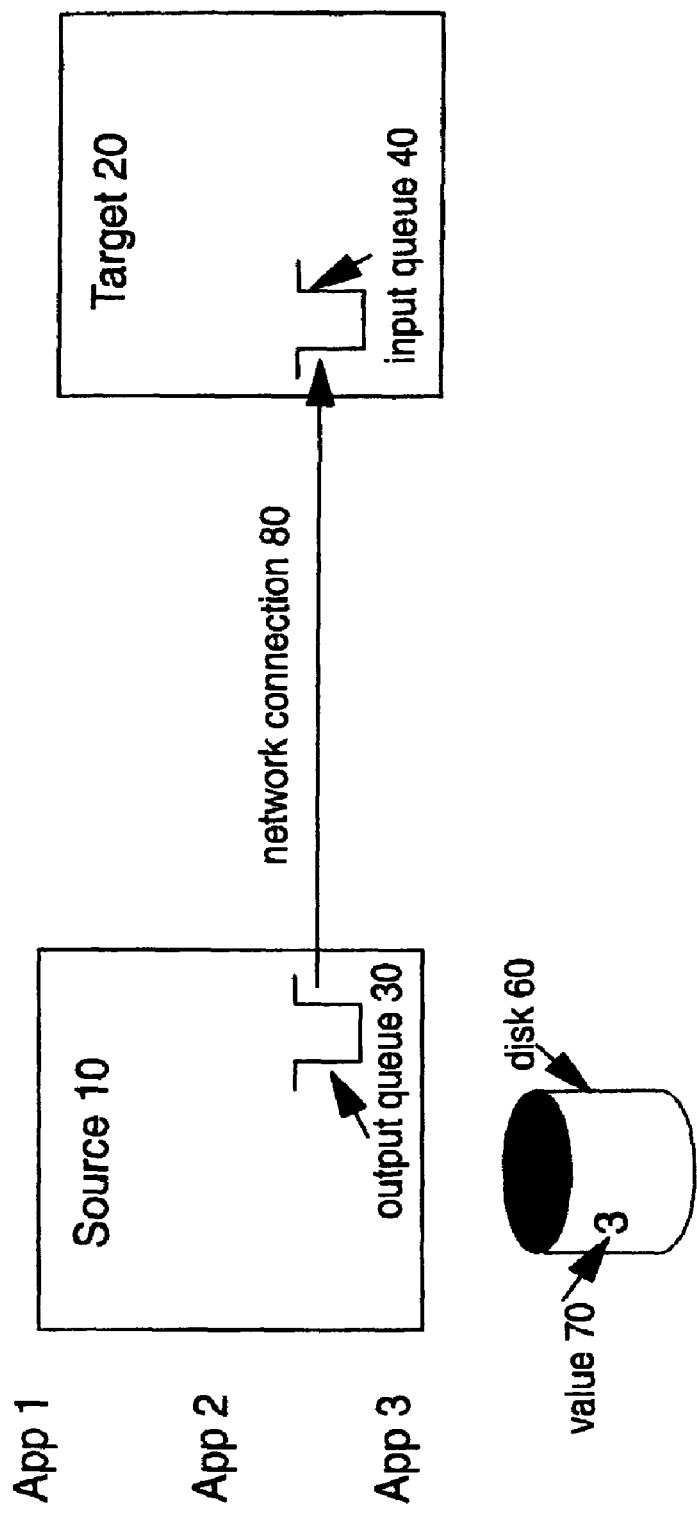
FIG. 1 shows a messaging system in accordance with a preferred embodiment of the present invention.

FIG. 1 shows a messaging system in accordance with a preferred embodiment of the present invention. Applications (App) 1, 2, 3 put messages to an input queue (not shown) at a source 10. The source then transfers such messages to an output queue 30.

At the same time as the source 10 places a message on its output queue 30, a copy of the message is written to long term or durable storage (e-g. disk 60) (i.e. logged). Each message is identified by a sequence number (allocated at the source). This sequence number is written into the logged copy of the message as well as into the copy of the message placed on the source's output queue 30.

Messages on the output queue 30 are sent across a network connection 80 to the input queue 40 of a target 20. The target 20 can then remove messages from its input queue 40 for processing (once it has stored the messages on a disk in the target; message removal is also preferably logged). Such processing could involve, for example, updating a database using a message.

Note, a copy of each message is retained on the output queue at the source until the source can be sure that the message has been safely received by the target.

As each message (or a set of messages) is received by the target 20, acknowledgment of safe receipt is sent back to the source 10. The sequence number (initially allocated at the source) sent with the acknowledgement enables the source 10 to identify the message being acknowledged. An acknowledged message can then be deleted from the output queue 30 of source 10.

It can be seen however that in the preferred embodiment no PREPARE record is logged, nor is a PREPARE command used to denote a handover from source to target.

It is however preferable for the source to be able to determine that such handover could have occurred and that as a result, certain of the messages on the output queue may be INDOUBT—i.e. the responsibility of the target.

For this reason a Max INDOUBT value 70 is persisted to disk 60. In this example the value is 3. This value denotes the maximum number of messages that the source will permit to go INDOUBT at any one time.

Messages are typically removed from a queue in first in, first out (FIFO) order. Thus value 70 denotes that the first x messages (where x equals value 70) may be INDOUBT. Any remaining messages on the output queue 30 are therefore treated as definitely not INDOUBT. (Note, the messages do not have to be transmitted in order (because each message has a sequence number), but messages other than those in the first x should not be transmitted.)

A message is received at source 10. This message is placed on output queue 30. In theory, all messages on output queue 30 are ready to be sent to target 20 and may thus be placed in the INDOUBT status. However, in accordance with a preferred embodiment of the present invention, value 70 is used to denote the maximum number of messages on the queue that may be placed INDOUBT at any one time.

Thus a comparison is made between the number of messages already on the output queue (i.e. excluding the newly received message) and max INDOUBT value 70. If the number of messages on the queue is less than max INDOUBT value 70, then the received message is also permitted to go INDOUBT and will be transmitted.

However, if the number of messages on the queue is not less than value 70, then the newly received message is not permitted to go INDOUBT and consequently transmission of the message is blocked. Transmission continues to be blocked until the newly received message falls within the range denoted by the maximum INDOUBT value 70 and the head of the queue.

As previously alluded to, a sequence number with an acknowledgement from the target enables the source to determine which of the INDOUBT messages on output queue 40 has been safely received. This message can then be deleted from the output queue at the source. As a result a newly arrived message (if the number of messages already on the queue was before the deletion equal to the max value 70) or another message already on the queue (and now as a result of the deletion one of the first x messages) may be permitted to go INDOUBT and be transmitted.

Use of the max INDOUBT value in this way achieves the following advantage:

Definitely not INDOUBT messages may be safely removed by an administrator from those eligible for transmission. Such removed messages can be, for example, be reallocated by a workload manager to a different target system. There is no danger that such messages may have been handed over to the target and therefore there is no possibility of duplicating the messages (i.e. that the message will be seen by more than one target).

It is preferably possible, in accordance with a preferred embodiment of the present invention, for an administrator to set the initial value 70. Such a value is preferably chosen based on an analysis of a variety of parameters such as the speed of the network connection and the ability of the target 20 to process messages. It is important not to set this value too high. If too many messages are permitted to become INDOUBT at the source at any one time, then the input queue 40 at the target will soon fill up since the target 20 will not be processing (and thus removing) messages quickly enough (i.e. the amount of memory needed by the target to store messages that it wishes to acknowledge will increase). Further at the source there would be fewer definitely not INDOUBT messages which could be removed or reallocated for processing by another system.

It will of course be appreciated that such parameters may change or equally that an initial determination of an appropriate value 70 may be found to be inefficient. Thus, it is preferably possible to modify value 70 by writing a new value to disk 60.

Note in another embodiment value 70 is not persisted to disk but is hard-coded into the processing of the source messaging system. The disadvantage of this is that in this embodiment an administrator is not given the option of setting/modifying the value 70.

Modification of value 70 will be described with reference to FIG. 2. At step 200, a new value for 70 is received. If it is determined that the new value is greater than the old value (step 210), then the old value on disk is overwritten with this new value (step 220). Thus it may be determined that the number of assumed to be INDOUBT messages is lower than value 70 and thus that a newly received message may be permitted to-also go INDOUBT. (Of course if there are already more messages on the queue than the old max value, then more of those message(s) will be permitted to go INDOUBT as a result of the increase in max INDOUBT value 70.)

If it is determined that the current number of assumed to be INDOUBT messages is greater than the new value, then the new value is written to disk without overwriting the old value (step 230). (If this is not the case then there is not the danger of assuming that INDOUBT messages are not INDOUBT).

Thus both the new and the old values are preferably maintained on disk. At the time when the new lower value is received, assumed to be all of the messages denoted by the old higher value could be INDOUBT. Thus if the old value of 70 was 5 and a new value of 3 is then received from an administrator, it is possible that all of the first 5 messages on the output queue 30 are already INDOUBT (despite the fact that no more than 3 should now be INDOUBT). Thus it is not possible to immediately achieve the new value 70.

It is determined from old value 70 how many messages on the queue are assumed to be INDOUBT (whether or not these are actually INDOUBT at the current time, they will go INDOUBT) and as acknowledgements for INDOUBT messages are received from the target system (step 2401, such messages are deleted from the queue. When sufficient acknowledgements have been received to make the number of INDOUBT messages reduce to the new value, then the old value can be deleted from the disk (i.e. when a number of acknowledgements have been received that is equal or greater than the difference between the old max value and the new max value (step 2501, the old max value may be deleted from disk) (step 260). Henceforth, the new value is used to determine the maximum number of messages that may go INDOUBT at any one time.

Figure 2:
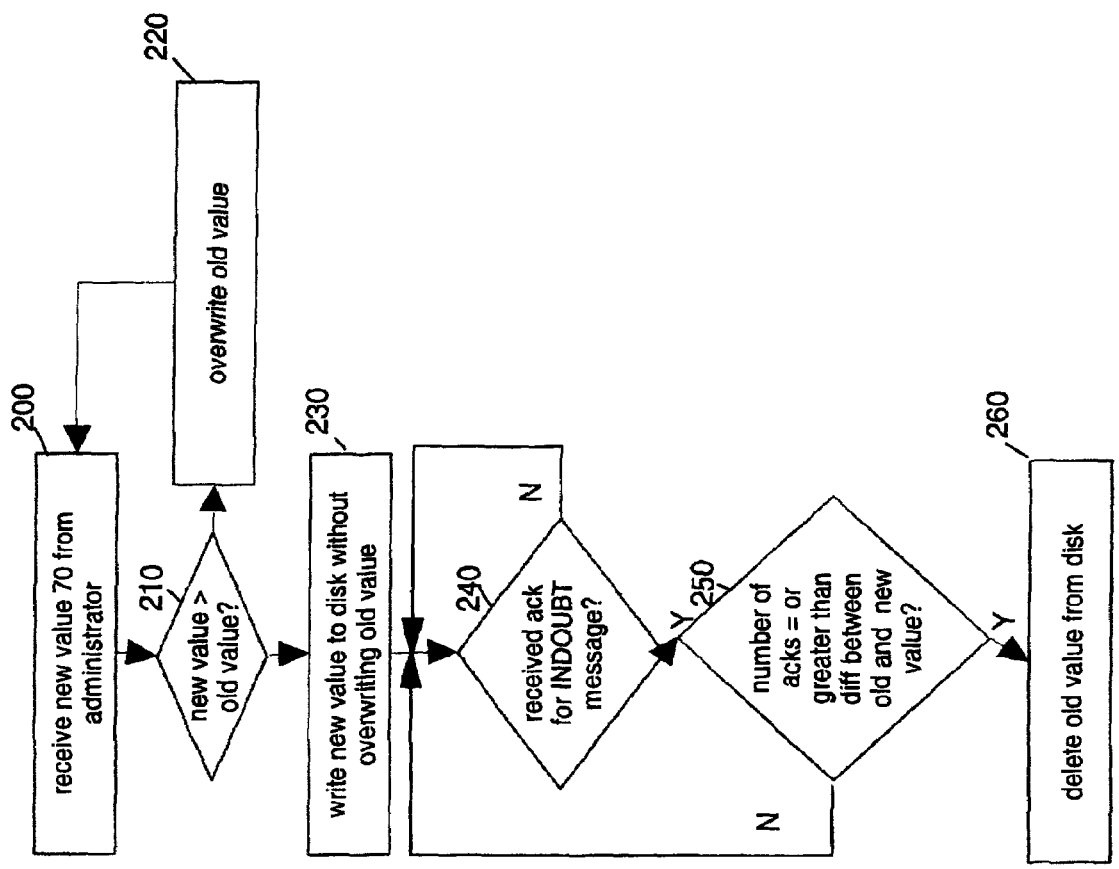
FIG. 2 shows modification of value 70 in accordance with a preferred embodiment of the present invention.

Note, if the number of messages actually on the queue is less than or equal to the new maximum value, then the new value can be adopted immediately (this is not shown in FIG. 2).

Note, the reason for keeping both the old and the new value on disk concurrently is in case of system failure. If the system fails before the new value is adopted, then a pessimistic view is taken—i.e. the old higher value is used.

In accordance with a preferred embodiment, the max INDOUBT value may be dynamically changed by the system in the event of the source failing to communicate with the target (e.g. target is down or network failure). The reason to do this would be to minimise the number of messages made INDOUBT to the target and therefore not eligible for re-routing (even though the source cannot send them to the target at the moment).

Figure 3:
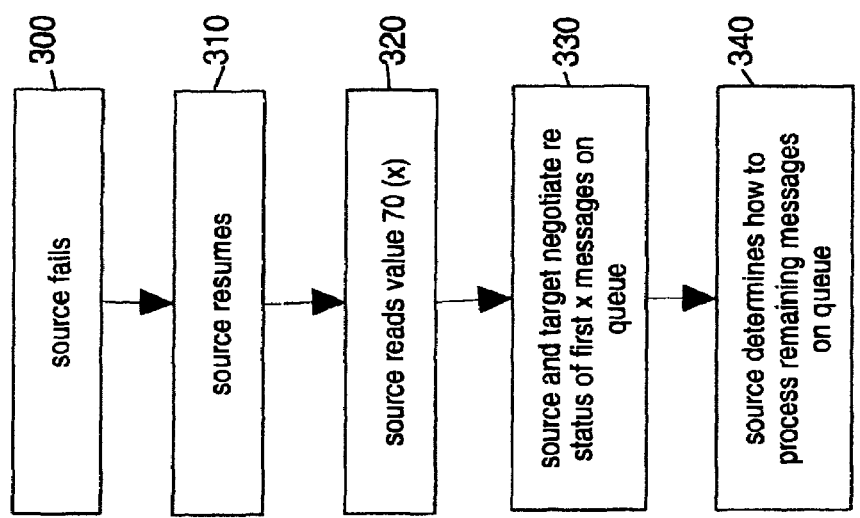
FIG. 3 illustrates, in accordance with a preferred embodiment of the present invention, the use of value 70 in recovering from a failure of source 10.

Via the use of value 70, it is possible for a messaging system to determine the maximum number of messages on a queue that may be INDOUBT at any one time. By way of example, suppose that value 70 is 4, only a maximum of 4 messages may ever go INDOUBT at any one time. In the process of sending message 3, the messaging system may suffer a failure at some point (e.g. source, network connection, target). FIG. 3 illustrates, in accordance with a preferred embodiment of the present invention, the use of value 70 in recovering from a failure of source 10.

At step 300, source 10 fails. Upon resumption of the source at step 310 a log is used to reconstruct output queue 30. Once the queue has been reconstructed, source 10 reads value (x) 70 off disk 60 (step 320). From value 70, the source can be sure that at most, the first x messages on output queue 30 are INDOUBT. Thus the source and the target negotiate to determine whether all of the assumed to be INDOUBT messages were received by the target (step 330). Note, in order to do this the source may ask target what was the last message received. Based on the answer, the source will either know which messages were received and which messages it is safe to re-process. For example if the last message received had an id of 4 and the INDOUBT messages on the queue have ids of 3, 4 and 5, the source can deduce that message 5 was never received and can therefore be re-processed. Such negotiation will not be described in any more detail since the skilled person will already be familiar with such processing.

Regarding those messages on the queue that were definitely not INDOUBT when the source failed (i.e. those falling outside of value 701, the source knows immediately that these messages can be processed (step 340). There is no need to converse with the target regarding such messages. Thus such messages could for example be sent elsewhere for processing—e.g. if the target system was down at the time of resumption of the source. In the absence of such a solution, it would otherwise be necessary to wait for the target to resume (and for the source and target to negotiate with one another) before it would be possible to process any of the messages on the queue. Otherwise it would be quite possible that some messages would be processed twice.

Whilst FIG. 3 describes the failure of the source, it should be appreciated that the advantages of the present invention (in accordance with a preferred embodiment) are just as applicable to failure of the network connection or the target itself. In all case, the source knows from value 70 that a maximum of x messages may be INDOUBT at any one time and thus that any messages falling outside x can be safely processed.

An optional improvement on the above is that if the source detects a failure to communicate with the target and the current number of assumed to be INDOUBT messages queued is less than the max value, then the max value is reduced to the current number of messages and this value is logged—but does not overwrite the configured max value (e.g. if max value is 5 and 3 messages are currently queued for transmission and a failure is detected the max value is brought down to 3). This prevents subsequent messages 4 and 5 needlessly going INDOUBT to the target. Once communication with the target is recovered the configured value is restored as the max value (that is the reason why the original max value is not overwritten when the updated value is logged.

Note, whilst in the preferred embodiment all messages for the target are put to the output queue 30 (irrespective of whether those messages are INDOUBT or not), this does not have to be the case. For example, in another embodiment only INDOUBT messages are placed on output queue 30. Other messages are in this case stored at another queue.

The invention claimed is:

1. A source messaging system comprising:
a queue for receiving messages;
a data processor coupled to a memory and operable for executing instructions in the memory to perform steps of:
the queue receiving a message;
responsive to receiving the message, determining whether the message should be permitted to become INDOUBT, wherein the determining comprises:
retrieving a maximum value denoting a maximum number of messages that may be permitted to become INDOUBT at any one time;
determining whether the message falls within the range denoted by the maximum value;
responsive to determining that the message falls within the range, permitting the message to become INDOUBT;
responsive to determining that a failure has occurred:
(i) using the maximum value to determine the maximum number of messages that may be INDOUBT;
(ii) negotiating with a target messaging system to determine how many of the messages falling within the range denoted by the maximum value at the time of failure have been received by the target system; and
(iii) transmitting messages outside the range denoted by the maximum INDOUBT value to another data processing system.

2. A method for facilitating data transfer from a source messaging system having a queue, the method comprising steps implemented by the source message system of:
the source messaging system determining whether a message should be permitted to become INDOUBT, comprising:
(i) retrieving a value denoting the maximum number of messages that may be permitted to become INDOUBT at any one time;
(ii) determining whether the message falls within the range denoted by the value;
(iii) in response to determining that the message falls within the range, permitting the message to become INDOUBT; and
(iv) in response to determining that the message falls outside of the range, blocking transmission of the message from the source until the message falls within the range;
the source messaging system receiving a value denoting a new maximum number of messages that may be permitted to go INDOUBT at any one time;
the source messaging system receiving an acknowledgment of successful receipt of a message at a target;
the source messaging system determining that the new maximum value is less than the old maximum value;
the source messaging system determining a number of messages on the queue;
in response to determining that the new maximum value is less than the old maximum value and that the number of messages on the queue is more than the new maximum value, the source messaging system counting a number of acknowledgements received from the target; and
in response to determining that the number of acknowledgements received is equal or greater than the difference between the old maximum value and the new maximum value, the source messaging system using the new value to determine that number of messages permitted to become INDOUBT.

3. A source messaging system comprising a data processor coupled to a memory, wherein the data processor is operable for executing instructions in the memory to perform the steps of claim 2.

4. A non-transitory computer readable media storing a computer program product for facilitating data transfer from a source messaging system having a queue, said computer program product comprising instructions operable by the source messaging system for performing the steps of claim 2.

* * * * *